March 4, 1930.  W. SONTAG  1,749,266
BAFFLING DEVICE
Filed Jan. 9, 1928   4 Sheets-Sheet 1

INVENTOR.
Walter Sontag.
BY
A. B. Foster
ATTORNEY.

March 4, 1930.  W. SONTAG  1,749,266
BAFFLING DEVICE
Filed Jan. 9, 1928   4 Sheets-Sheet 2
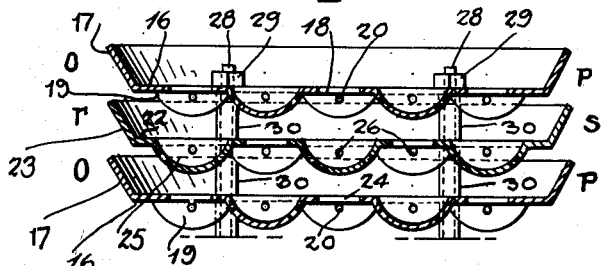
Fig.4b.
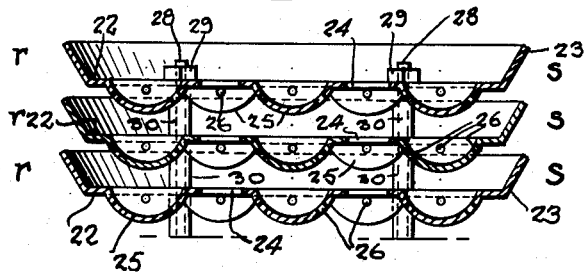
Fig.4a.
Fig.6.
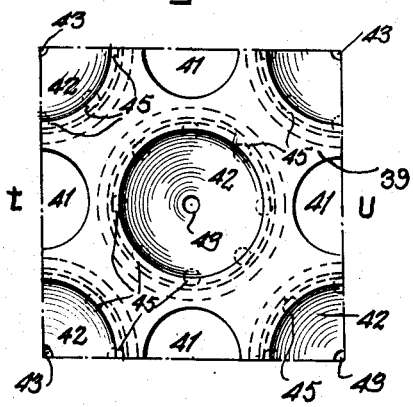
Fig.6a.
INVENTOR.
Walter Sontag
BY
A. B. Foster
ATTORNEY.

March 4, 1930. W. SONTAG 1,749,266
BAFFLING DEVICE
Filed Jan. 9, 1928 4 Sheets-Sheet 3
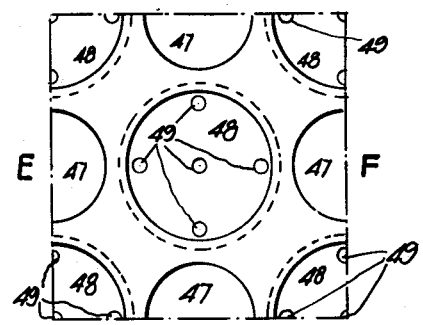
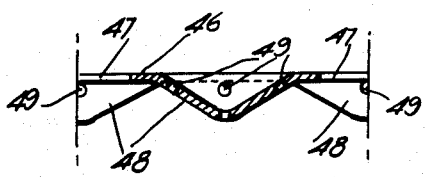
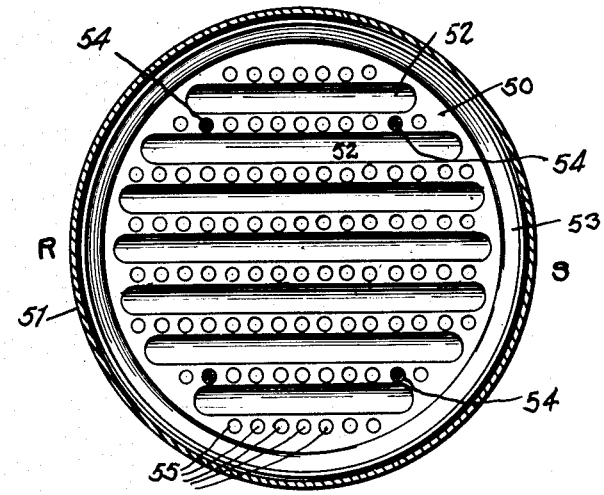
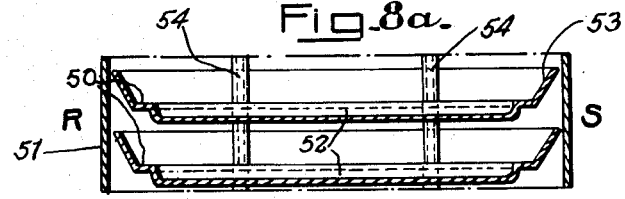
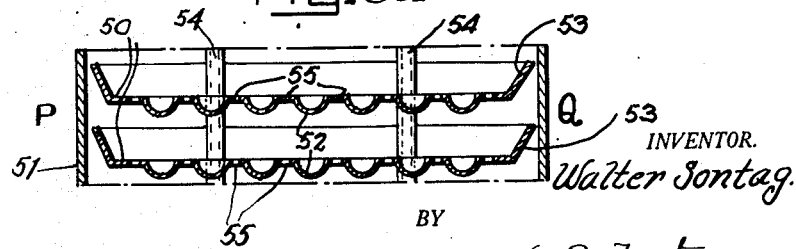
INVENTOR.
Walter Sontag.
BY
A. B. Foster
ATTORNEY.

March 4, 1930. W. SONTAG 1,749,266
BAFFLING DEVICE
Filed Jan. 9, 1928 4 Sheets-Sheet 4

INVENTOR.
Walter Sontag.
BY
A. B. Foster
ATTORNEY.

Patented Mar. 4, 1930

1,749,266

UNITED STATES PATENT OFFICE

WALTER SONTAG, OF BADEN, NEAR VIENNA, AUSTRIA

BAFFLING DEVICE

Application filed January 9, 1928. Serial No. 245,523.

This invention relates to a process and apparatus for the baffling of gases, vapors, liquid and certain solid substances, and more particularly it relates to arrangements for the separation of higher boiling constituents from lower boiling ones. The invention relates in particular to fractionating columns, evaporators and the like and to apparatus for the absorption of gases or vapors in liquid absorbents and to arrangements for the evaporation of liquids into gases, vapors or the like. The invention likewise relates to the means for the separation of small sustained bodies such as liquid droplets and small solid particles from the gases or vapors containing them.

One object of my invention is to provide devices for accomplishing the aforesaid matters, and my devices are especially adapted for continuous commercial operation on small or large scales and are so designed that they may be used singly or in series. When used in series they may be severally maintained either under substantially uniform operating conditions or under different operating conditions to effect the desired treatment of the material passing therethrough. The vapors evaporated or the liquids or solids separated may be taken off the single or multiple apparatus as fast as formed, and collected to constitute the ultimate products.

A further object of my invention is to provide devices to fractionate liquid mixtures of all kinds in such a manner as to conserve the heat to the best advantage by arranging for an advantageous heat exchange between the ascending vapors and descending reflux. Other objects and advantages of my invention are the manner in which I obtain the desired results, which will become apparent from the following disclosure and claims.

The devices presented may be applied in various fields of manufacture having to do with the separation of mixtures of liquid constituents having different boiling points, the absorption of gases or vapors in liquid absorbents, the evaporation of liquids in certain gases or vapors, the separation of small bodies from gases or vapors, etc.

The invention may be advantageously used in the oil industry where crude oil is to be fractionated and variously treated. It may be also used in the manufacture of high grade alcohols and the like, acids of various kinds, and for the recovery of gasoline from gases or vapors containing it, etc.

My invention combines elements including plates which are equipped with dishes or pools for liquids and holes for the circulation of elastic fluids and liquids, and a combination thereof. The form, size and position of the plates, dishes and holes may vary and these factors will depend upon the type of condition of manufacture and the type of service to be done by the devices.

In order to make this invention clearly understandable to those skilled in the art I have constructed certain drawings illustrating preferred forms of the invention.

Figure 1ª is a vertical section taken on the line $d$—$e$ of Figure 1.

Figure 2ª is a vertical section on the line $f$—$g$ of Figure 2.

Figure 3:
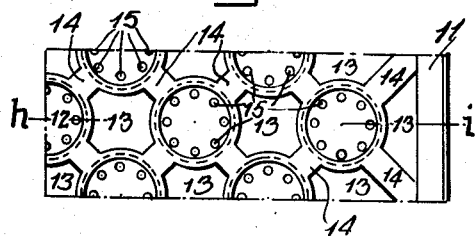
Figure 3A:
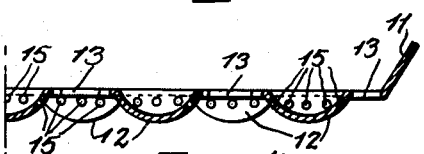

Figure 3 and Figure 3ª similarly show yet another modification such as my invention may take.

Figure 5:
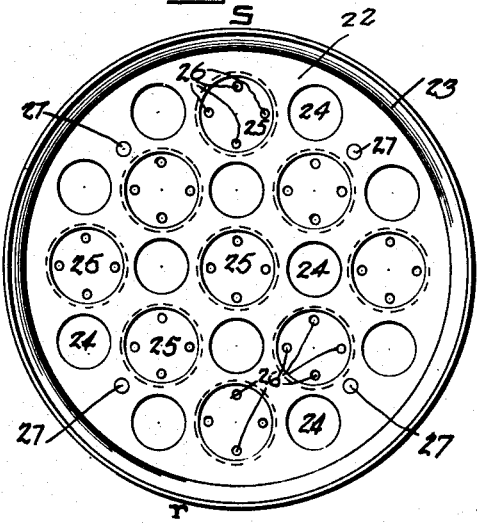
Figure 4:
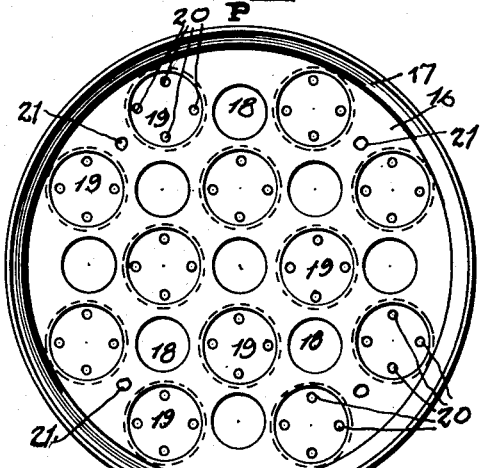

Figures 4 and 5 are plan views of two modifications of entire plates such as may be used in practicing my invention.

Figure 4ᵇ shows three plates in vertical section, the upper and lower plates corresponding to a section $o$—$p$ taken from Figure 4, and a central plate corresponding to a section taken from line $r$—$s$ of Figure 5. Figure 4ª is a vertical section of an assembly of three plates corresponding to sections taken on the line $r$—$s$ of Figure 5.

Figure 6 is a partial plan view of a double plate element constituting one modification which my invention may take. Figure 6ª is a vertical section on the line $t$—$u$ of Figure 6.

Figure 7 is a plan view of a portion of a plate showing a different modification. Figure 7ª is a vertical section taken on the line $e$—$f$ of Figure 7.

Figure 8 is a transverse section of a combination of elements arranged and constructed in accordance with my invention surrounded by a shell. Figure 8ᵃ is a vertical section taken on the line r—s of Figure 8. Figure 8ᵇ is a vertical section taken on the line p—q of Figure 8.

Figure 9:
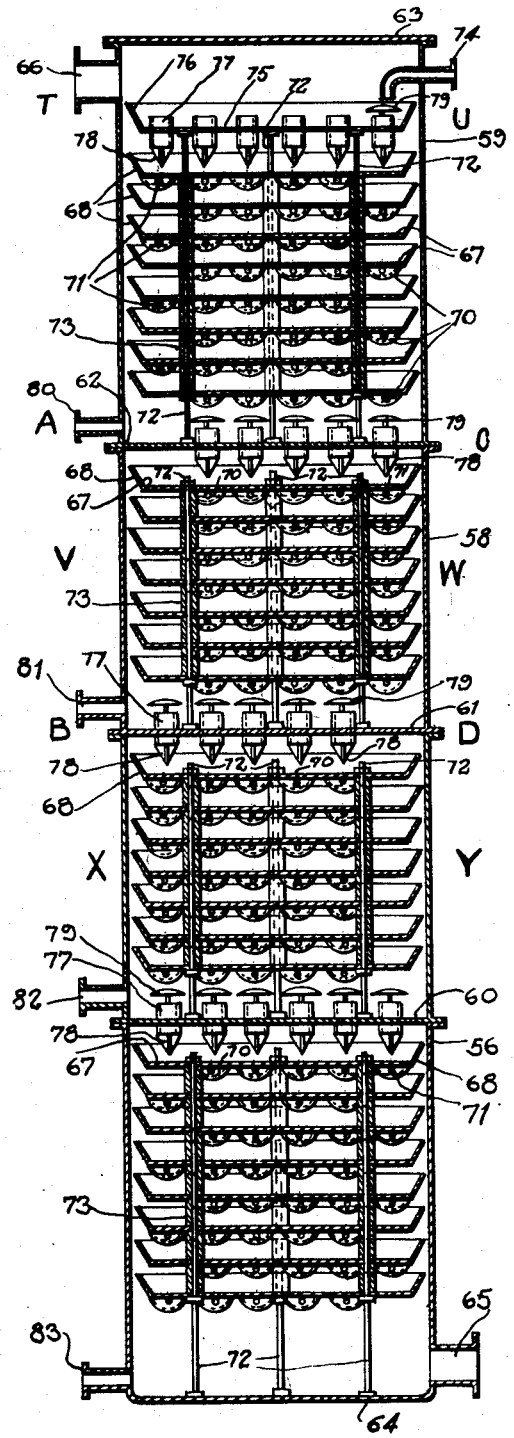
Figure 9A:
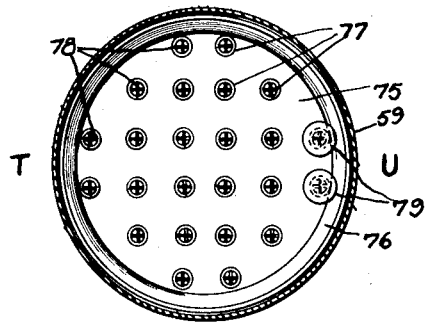
Figure 9B:
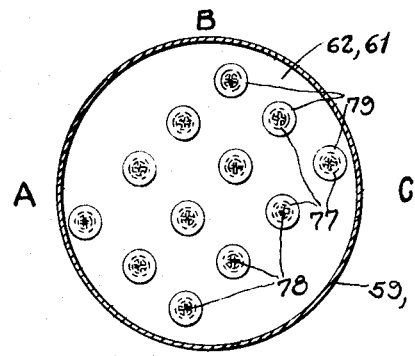
Figure 9C:
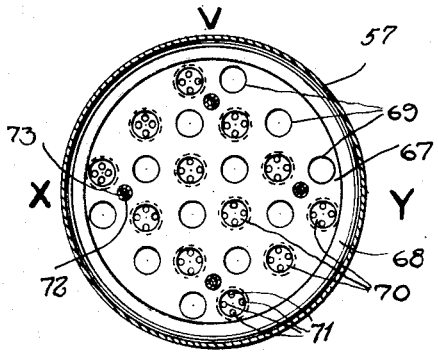

Figure 9 is a vertical section of an apparatus equipped with several sets of elements arranged and constructed in accordance with my invention. Figure 9ᵃ is a section taken on the line t—u of Figure 9. Figure 9ᵇ is a section taken on the line a—c of Figure 9. Figure 9ᶜ is a section taken on the line x—y of Figure 9.

The elements and combinations of elements illustrated in the aforesaid figures show a limited number of modifications of my invention. Many other modifications are of course possible, those illustrated are intended simply to indicate the principal features of various modifications of my device. Like reference number are used on the various figures to designate the same parts.

Figure 1:
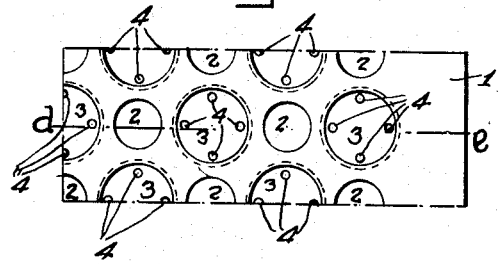
Figure 1 is a partial plan view of a plate designed and constructed in accordance with my invention.
Figure 1A:
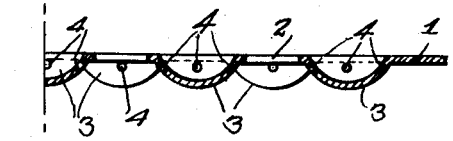

As clearly shown in Figures 1 and 1ᵃ the plate 1 has holes 2 of circular shape and pools or dishes 3 having small holes 4. The border of the plate may be made in any form to suit the apparatus used. The small section shown has a straight border on one end.

Figure 2:
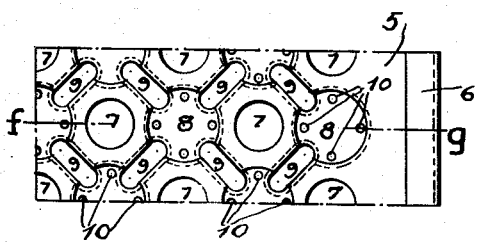
Figure 2 is a view similar to Figure 1 of a modified form which my invention may take.
Figure 2A:
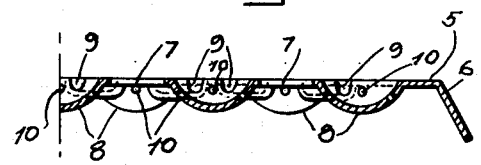

In Figures 2 and 2ᵃ, a plate 5 has circular holes 7 and pools or dishes 8; the latter being connected with each other by grooves or channels 9. If a difference arises in the level of the liquid in various dishes 8 a circulation equalizing the level of the liquid in the various dishes may take place through the channels 9. The pools or dishes 8 have small holes 10 therein through which liquid in excess of a certain amount may overflow. The border 6 of plate 5 may be of any shape, and as shown in Figure 2 is bent downwardly.

In Figures 3 and 3ᵃ the holes and dishes are so arranged and proportioned that the dishes are connected by a small skeleton of strips 14. It will be noted that the holes 13 are no longer circular but are shaped so as to leave only the dishes 12 and a small border around the dishes and narrow strips connecting the dishes. The dishes have near the edge of the same small holes 15. In this modification another shape of border is shown, and as will be noted in Figure 3ᵃ the border is turned upwardly.

Figure 4 shows a plan view of an entire plate 16 of circular form; its border 17 may be of any form; that illustrated is bent upwardly. The plate 16 has circular holes 18 and dishes 19, the latter being equipped with small holes 20 in the upper part thereof. The holes 21 are prepared for a mechanical support.

On Figure 5 is shown the plan view of another entire plate 22 of circular form. Its border 23, which may be of any form, is shown bent upwardly. The holes 24 and dishes 25 having small holes 26 in the upper part are of the same form and size as those of plate 16 in Figure 4 but they are differently positioned. The holes 27 in plate 22 are to accommodate a mechanical support.

Figure 4ᵇ shows the higher part of a combination of plates 16 and 22 in vertical section; there are two plates 16 with borders 17, holes 18 and dishes 19 having small holes 20 therein. Between the two plates 16 is one plate 22 with a border 23, holes 24 and dishes 25 having small holes 26. Under the lower plate 16 a second plate 22 may be placed and under it a third plate 16, and so on. All plates can be supported by any suitable mechanical means; and that illustrated consists of rods 28 with bolts 29 on the top. The rods 28 go through holes 21 in plates 16 and holes 27 in plates 22. The plates are held spaced by bushings 30.

Figure 4ᵃ is a vertical section of a combination of plates 22, all being supported by a mechanical support similar to that illustrated and explained with reference to Figure 4ᵇ. All plates 22 in Figure 4ᵃ are arranged in parallel and in the same position with respect to each other.

Figures 6 and 6ᵃ show a part of a double plate forming one single element which consists of a higher plate 39 and a lower plate 40 positioned comparatively near and parallel to each other. The plate 39 has holes 41 and dishes 42 with a single hole 43 in the bottom of the latter, plate 40 has holes 41 of the same size and coaxial with reference to holes 41 in plate 39 and dishes 44 surrounding dishes 42 and coaxial to the latter. There are in dishes 44 small holes 45 pierced through the higher part of the walls.

Figures 7 and 7ᵃ show a part of a plate 46 with holes 47 of circular form and dishes 48 of conical shape with rounded lower part; the dishes 48 are equipped with small holes 49 in the lower and higher parts.

Referring to Figures 8, 8ᵃ and 8ᵇ, there is shown a part of a combination of circular plates 50 surrounded by a shell 51. Holes 55 and dishes 52 are formed in each plate 50, the dishes 52 being of different lengths owing to the circular shape of plates 50, and said dishes are equipped with small holes in the upper part not shown. The borders 53 of the plates 50 are bent upwardly. A plurality of plates 50 are here shown positioned symmetrically one upon another. In another arrangement they may be differently positioned. A mechanical arrangement 54 similar to that of Figures 4ᵈ and 4ᵖ is provided to hold the plates 50 in position.

Referring to Figures 9, 9ᵃ, 9ᵇ and 9ᶜ there are shells 56, 57, 58 and 59 in upright position one upon another and separated by intermediate plates 60, 61 and 62. The top of shell 59 is tightly closed by cover 63 and the bottom of shell 56 by a bottom plate 64. An inlet 65 for elastic fluid to be treated is provided on the lower part of shell 56 and an outlet 66 for the same on the higher part of shell 59. It is to be understood that the function of the inlet and outlet may be reversed when desired in all modifications shown. The plates 67 are equipped with upwardly bent borders 68, holes 69 and dishes 70 having small holes 71 in the higher part. The plates 67 are positioned vertically above and parallel to each other in the inner part of shells 56, 57, 58 and 59 and fixed in position by any suitable mechanical means; that illustrated consists of rods 72 and bushings 73. All plates 67 are of identical construction and shape but some are especially positioned. Those in shell 59 are brought into two different positions; the highest plate 67 is positioned to conform to line X—Y in Figure 10$^c$, the plate 67 next lower conforming to line V—W, the third plate 67 being the same as the highest, and so on. The difference in position is caused by a horizontal rotation of every other plate 67 through an angle of 90°.

The plates 67 in shell 58 are all in the same position conforming to line V—W in Figure 10$^c$ and those in shell 57 are all in the same position according to line X—Y in Figure 10$^c$. The plates 67 in shell 56 are positioned in a similar manner as those in shell 59.

The different positions and arrangements chosen for the plates 67 in the different shells in Figures 9, 9$^b$ and 9$^c$ illustrate some possibilities for the positions and arrangements of said plates. The example given with reference to said figures does not constitute one single special arrangement. The kind of arrangement of the plates 67 in shell 59 may have some advantages for use as means for separating small bodies out from elastic fluid flow while the arrangement of plates 67 in shells 58 and 57 may sometimes be preferred in evaporators, fractionating towers and similar apparatuses.

The plates 67 positioned in shells 59 and 56 have in vertical view the succession as follows: a hole, then a dish, then again a hole and so on; or a dish, then a hole, then again a dish and so on. The plates 67 positioned in shells 58 and 57 have in vertical observation the following succession: a dish, then again a dish, again a dish, and so on; or a hole, then again a hole, again a hole and so on. This difference in shells 59 and 56 is caused by a horizontal turn of each second plate 67 through an angle of 90°.

In the higher part of shell 59 an inlet 74 is provided for liquid to be directed into the top plate 75 in said shell for further distribution into the dishes 70 of the highest plate 67 and into the plate 67 next lower in shell 59. The top plate 75 has a border 76, which is bent upwardly, and vertical tubes or escapes 77 tightly fitted into top plate 75 and equipped with cross pieces 78 in the lower end. Figure 9$^a$ shows the general arrangement of said vertical tubes 77 in top plate 75; the liquid incoming through inlet 74 fills the top plate 75 and overflows through all vertical tubes 77 and runs down over the cross pieces 78 into said dishes 70 in the two highest plates 67.

The two vertical tubes 77 on the right in top plate 75 are equipped with roof plates 79 which hinder a direct run down of liquid incoming through inlet 74 but do not hinder the overflow of liquid through said vertical tubes.

Intermediate plates 60, 61 and 62 between the inner parts of several shells are equipped with an arrangement of vertical tubes 77 tightly fitted into intermediate plate 60 and equipped also with cross pieces 78 in the lower end, but each vertical tube 77 has a roof plate 79 arranged above. The roof plates 79 serve to hinder a direct passing of liquid dropping down from the plates 67 in shells 59, 58 and 57, but do not hinder the overflow of liquid gathered in the lower inner parts of said shells. The locations of the vertical tubes 77 in intermediate plates 62 and 61 are illustrated by Figure 9$^d$; for plate 62 on the line A—C and for plate 61 on the line B—D; the vertical tubes 77 in plate 62 are arranged so that liquid filling the lower inner part of shell 59 overflows through the vertical tubes 77 and runs into the dishes 70 in the highest plate 67 in shell 58; the vertical tubes 77 in intermediate plate 61 are arranged so that liquid gathering in the lower inner part of shell 58 overflows through the vertical tubes and runs down into the dishes 70 in the highest plate 67 in shell 57.

On the lower left part of shell 59 is an inlet 80 (or outlet, depending upon the manner of use), provided for the liquid, and inlets 81 and 82 are arranged in the lower left part of shells 58 and 57 respectively. There is provided a draw off line 83 in the lower left part of shell 56 so that liquid gathering there can be drawn off if so desired.

For use the elements or plates may be brought into some shell and fixed therein as illustrated for instance by figures 6, 9, 9$^a$, 9$^b$ and 9$^c$.

In case the arrangement in Figure 4$^b$ shall serve as as fractionating device it is brought into a closed shell with inlets and outlets for elastic fluid to be fractionated and inlet distributing means and outlet for reflux liquid. The elastic fluid, coming from a still for instance, enters under the lowest of the plates 16 and 22 in Figure 4$^b$, ascends through the holes and around the dishes in said plates in upward direction and leaves finally the inner part of the shell from above the highest plate for further treatment; the liquid reflux, coming from a cooler, or dephlegmator for instance, enters into the shell above the highest plate and is distributed into the dishes 19 of the highest plate 16 and through the latter's holes 18 into the dishes 25 of the plate 22 next lower. The reflux fills said dishes, leaves them through the small holes 20, 26 respectively, forms a comparatively thin sheet around the middle and lower outer part of said dishes and runs down from the lowest point through the holes 24, 18 respectively, of plate 22 and the lower plate 16 respectively, into the dishes of the latter plate and of the plate next lower. This happens over and over again until the reflux drops from the lowest plates into the space under the latter in the shell and may be taken out if desired.

The elastic fluid to be treated ascends up through the holes and around the dishes as described while the liquid runs down through and around said dishes and through said holes. An effective treatment is thus realized. Conditions of heat exchange between elastic fluid and reflux, and conditions of evaporation of lower boiling constituents and of condensation of higher boiling ones are very advantageous. Low pressure loss, low resistance against the flow of elastic fluid to be treated, low difference in temperature in horizontal direction, but a considerable one in vertical direction if desired, and smooth operation may constitute some advantages of my invention for this kind of treatment.

If the combination illustrated by Figure 4$^a$ is to serve as a fractionating device it should be installed in a shell with inlet and outlet for elastic fluid, with inlet, distribution means and outlet for liquid reflux, and will then operate as follows. The reflux coming from a dephlegmator for instance, enters into the space above the plates 22 in the shell and is distributed into the dishes 25 in the highest plate 22 in Figure 4$^a$, fills said dishes and leaves them through the small holes 26, runs downwardly over the outer side of the latter, forms a comparatively thin sheet around the middle and lower outer side of the dishes and drops from the lowest points of the latter into the dishes 25 of the plate 22 next lower. Here it again fills the dishes 25 and leaves them as described, runs down and drops as described into the dishes 25 of the third plate 22, fills them and so on. Instead of plates 22 any other device in accordance with my invention may be used. There may be instead of holes 18 and 24 in Figures 4, 4$^a$, 4$^b$ and 5 those indicated in Figures 2 and 2$^a$, 3 and 3$^a$, 6 and 6$^a$, 7 and 7$^a$ and the like.

Instead of dishes 19 and 25 there may be arranged those illustrated by Figures 2 and 2$^a$, 3 and 3$^a$, 6 and 6$^a$, 7 and 7$^a$ and the like. If the dishes 48 on Figures 7 and 7$^a$ are used a comparatively small part of the reflux leaves the dishes 48 through the small hole 49 in the lower rounded part of the dishes 48 while the greater part of the reflux leaves through the small holes 49 in the higher part of the discs 48, runs down the outer side whereby it forms a comparatively thin sheet, gathers with the small part coming through the hole 49 in the rounded bottoms and drops down to points under the dishes 48. All these dishes with small holes and holes in the different plates show a few examples of how my invention can be realized. The position of the dishes and holes in the different plates or elements to each other in a combination thereof may be any that is suitable, and it is the same with their form and size, with the distance of the dishes and holes from each other and with the distance of the plates from each other; the most advantageous will be chosen for each case. The bigger the capacity of the dishes at disposal in a fractionating device the farther the fractionation may go, and the bigger the outer surface of the dishes with reference to their contact the better are the conditions of heat exchange between elastic fluid ascending around said dishes and the reflux in them. There are of course practical limits. With reference to Figure 4$^a$, elastic fluid may enter in a shell around the plates 22 under the lowest plate 22 and ascend then through the holes 24 and around the dishes 25 in the successive plates 22. Finally the elastic fluid may leave the shell from above the plates 22.

In some special cases it may be preferable to arrange several sets of plates side by side in the shell. In a round shell for instance instead of one set of circular plates two sets of plates of semicircular form side by side can be used, if the shell chosen had a rectangular section several small sets of rectangular form plates can be applied instead of one set of big rectangular plates.

The double plate shown in Figures 6 and 6$^a$ may be used if the downcoming liquid contains specific heavier and lighter constituents and if it may be desirable to facilitate the downcoming of the heavier ones. They may gather in the lower part of the dishes 42, flow through the hole 43 into the free space between the dishes 42 and 44 and overflow finally through the small holes 45, and forming a comparatively thin sheet around the middle and lower outer part of the dishes 43 the liquid may then run down and drop from the lowest part of the dishes 43 to points under the latter.

The operation in the device shown by Figures 8, 8$^a$ and 8$^b$ is similar to that explained already for Figure 4$^a$.

The arrangement shown in Figures 9, 9$^a$, 9$^b$ and 9$^c$ may be used in many different manners. However, I will herein describe it only as used for contacting a liquid and a gas by current flow.

When this is done the gas is caused to flow in at the bottom through inlet 65 and leaves the apparatus at the top through outlet 66. The liquid is caused to flow in at the top through inlet 74 and flows out at the bottom through outlet 83.

In certain cases it may be desirable to withdraw, insert or condition liquid intermediate the outlet and inlet and this may be done through the openings 80, 81 and 82.

The elastic fluid which is caused to flow in through inlet 65 will flow up through the openings in the plates and perhaps to some extent around the edges of the plates and will contact with the liquid which is falling from plate to plate as well as with the liquid which is spread out over the outer surface of the dishes 70, and the contact established between the downflowing liquid and upflowing gas is very thorough.

The liquid which is caused to flow in at inlet 74 will fill the first dish 76 sufficiently so that liquid will overflow the tops of the tubes 77 and will thus drop down to the next plate underneath. In the plates 68 it will fill the dishes and will flow out through the holes near the top of the dishes, spreading in a comparatively thin sheet over the outer surface of the dishes and then dropping to the plate next lower.

This type of system will be found very advantageous because of the excellent contact which is established between the counter flowing fluids and because of the excellent heat exchange which takes place between the gas and liquid but also between the liquid on the outside of the dishes and the liquid inside of the dishes.

Several of these devices may be arranged in series or in parallel relation as desired and of course the plates may be of any construction and shape in accordance with my invention.

The elements of my device may be constucted of any desirable material capable of withstanding the condition of manufacture and operation. Many different metals and alloys will be found practical for this purpose. In some cases it may be found desirable to construct the body of the elements of some material and to then plate it with another material.

When used for the fractionation of gasoline or crude oil steel sheets may be made into the plates if desired. Where the device is to be used for the fractionation of alcohol and the like the elements may be constructed of or plated with copper. Glass, quartz and the like may be used in the manufacture of strong acids, etc. Cast steel and cast iron may also be used where special service is to be done and in some cases lead and aluminum will be found highly advantageous.

Wherever in the specification and claims I use the term elastic fluid I wish it to be understood that I designate all gases and vapors.

It is to be understood that I do not desire to be limited to the exact details and construction described as obvious modifications will be apparent to those skilled in the art.

I claim as my invention:

1. In a device of the character described, an exterior shell, a plate within the shell, holes and dishes in the plate, holes in the upper part of the dishes, means adapted to deliver elastic fluids containing suspended liquids and solids under the plate, means adapted to remove elastic fluid from above the plate, means adapted to remove liquids with solids from under the plate, so that the elastic fluid containing suspended liquid and solids passes through the holes and around the dishes in the plate in upward direction and suspended liquid and solids are separated, gathered and directed down to points under the dishes.

2. In a device of the character described, an exterior shell, a plurality of superimposed spaced plates within the shell, holes and dishes in the plate, holes in the upper part of the dishes, the dishes and holes in the plates positioned alternately one upon another in the successive plates, means adapted to deliver elastic fluid containing suspended solids under the lowermost plate, means adapted to remove elastic fluid from above the uppermost plate, means adapted to remove liquid mixed with solids from under the lowermost plate, means adapted to deliver liquid into the dishes in the uppermost plate and in the plate next lower, so that the liquid fills the dishes, and leaves them through the holes in the upper part thereof.

3. In a device of the character described, an exterior shell, a plurality of superimposed spaced plates within the shell, relatively big holes and dishes in the plates regularly and symmetrically arranged over substantially the whole areas thereof, the holes and dishes positioned alternately one upon the other in the successive plates, relatively fine and closely spaced holes in the upper part of the dishes, means adapted to deliver elastic fluid under the lowermost plate, means adapted to remove elastic fluid from above the uppermost plate, means adapted to remove liquid from under the lowermost plate, means adapted to deliver liquid into the dishes in the uppermost plate and in the plate next lower.

4. In a device of the character described, an exterior shell, a double plate within the shell consisting of two plates parallel and comparatively near to each other, co-axial equal holes in both plates, co-axial dishes in both plates so that the dishes in the higher plate are smaller than those in the lower plate and regular intermediate spaces are left between the dishes; comparatively small holes in the lower part of the dishes in the upper plate, comparatively small holes in the higher part of the dishes in the lower plate, means adapted to deliver liquid into the dishes in the upper plate, means adapted to remove liquid from under the lower plate, means adapted to deliver elastic fluid under the lower plate, and means adapted to remove elastic fluid from above the upper plate.

In testimony whereof I affix my signature.

WALTER SONTAG.